(12) United States Patent
Ibaraki (10) Patent No.: US 7,747,153 B2
(45) Date of Patent: Jun. 29, 2010

(54) CAMERA HAVING AN IMAGE BLUR REDUCING FUNCTION AND ROTATION MEANS

(75) Inventor: Shouichi Ibaraki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 12/062,141

(22) Filed: Apr. 3, 2008

(65) Prior Publication Data
US 2008/0260369 A1 Oct. 23, 2008

(30) Foreign Application Priority Data
Apr. 19, 2007 (JP) ............................. 2007-110601

(51) Int. Cl.
*G03B 17/00* (2006.01)
(52) U.S. Cl. ...................... 396/55; 396/427; 348/208.3; 348/208.16
(58) Field of Classification Search .................. 396/55; 348/208.3
See application file for complete search history.

(56) References Cited

U.S. PATENT DOCUMENTS 6,233,219 B1   5/2001   Hori
6,751,410 B1 *   6/2004   Stavely ........................ 396/55
7,292,270 B2 *   11/2007   Higurashi et al. ........ 348/208.3
2007/0019106 A1 *   1/2007   Ibaraki ....................... 348/373

FOREIGN PATENT DOCUMENTS

JP   2001-155347 A   6/2001
JP   2001-358982 A   12/2001

* cited by examiner

*Primary Examiner*—W. B. Perkey
*Assistant Examiner*—Bret Adams
(74) *Attorney, Agent, or Firm*—Canon U.S.A., Inc. I.P. Division (57) ABSTRACT

A camera is provided with an image blur reducing function and rotation means. The image blur reducing function is turned off during rotation in a constant-speed drive pattern in which the rotation means rotates the camera at a constant speed from a start to an end of the rotation operation. The image blur reducing function is turned on during rotation in an intermittent drive pattern in which the rotation means intermittently executes drive operation from the start to the end of the rotation operation.

8 Claims, 9 Drawing Sheets

CAMERA HAVING AN IMAGE BLUR REDUCING FUNCTION AND ROTATION MEANS

BACKGROUND OF THE INVENTION

1. Field of the Invention

The present invention relates to a camera equipped with a camera platform (pan/tilt head) and its control method.

2. Description of the Related Art

Japanese Patent Application Laid-Open No. 2001-358982 discusses a technique for reducing or stopping a vibration-reducing function during panning in a typical video camera since if the vibration-reducing function is operated, an image blur is increased or decreased, thereby making an image appear unnatural.

Japanese Patent Application Laid-Open No. 2001-155347 discusses an image blur prevention apparatus that locks a vibration-reducing lens during a pan and tilt operation of a camera which does not need an image blur correction.

Generally, at a moment a camera stops a special high-speed rotation, the camera reciprocally vibrates in the direction of rotation. In the above-described conventional techniques, this vibration is not considered.

For example, in an intermittent rotation in which a camera repeatedly starts and stops rotating, the camera continuously vibrates. Thus, an image to be captured will blur. In this case, during rotation of a camera rotation unit, a vibration-reducing function can reduce the blur of an image to be captured.

SUMMARY OF THE INVENTION

The present invention is directed to a camera equipped with a camera platform capable of acquiring a suitable image in any camera rotation mode and its control method.

According to a first aspect of the present invention, a camera includes a camera unit having an image blur reducing function, a rotation unit configured to rotate the camera unit, and a processor configured to turn the image blur reducing function off during rotation of the camera unit in a constant-speed drive mode in which the rotation unit rotates the camera unit at a constant speed between the start and the end of the rotation operation, and configured to turn the image blur reducing function on during the rotation operation of the camera unit in an intermittent drive mode in which the rotation unit intermittently rotates the camera unit between the start and the end of the rotation operation.

According to a second aspect of the present invention, there is provided a method for controlling an image blur reducing function of a camera including a camera unit having an image blur reducing function and a rotation unit configured to rotate the camera unit. The method includes turning the image blur reducing function off during rotation operation of the camera unit in a constant-speed drive mode in which the rotation unit is driven at a constant speed between a start and an end of the rotation operation, and turning the image blur reducing function on during the rotation operation of the camera unit in an intermittent drive mode in which the rotation unit intermittently executes drive operation from the start to the end of the rotation operation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will now be described in detail with reference to the drawings.

First Exemplary Embodiment

Figure 1:
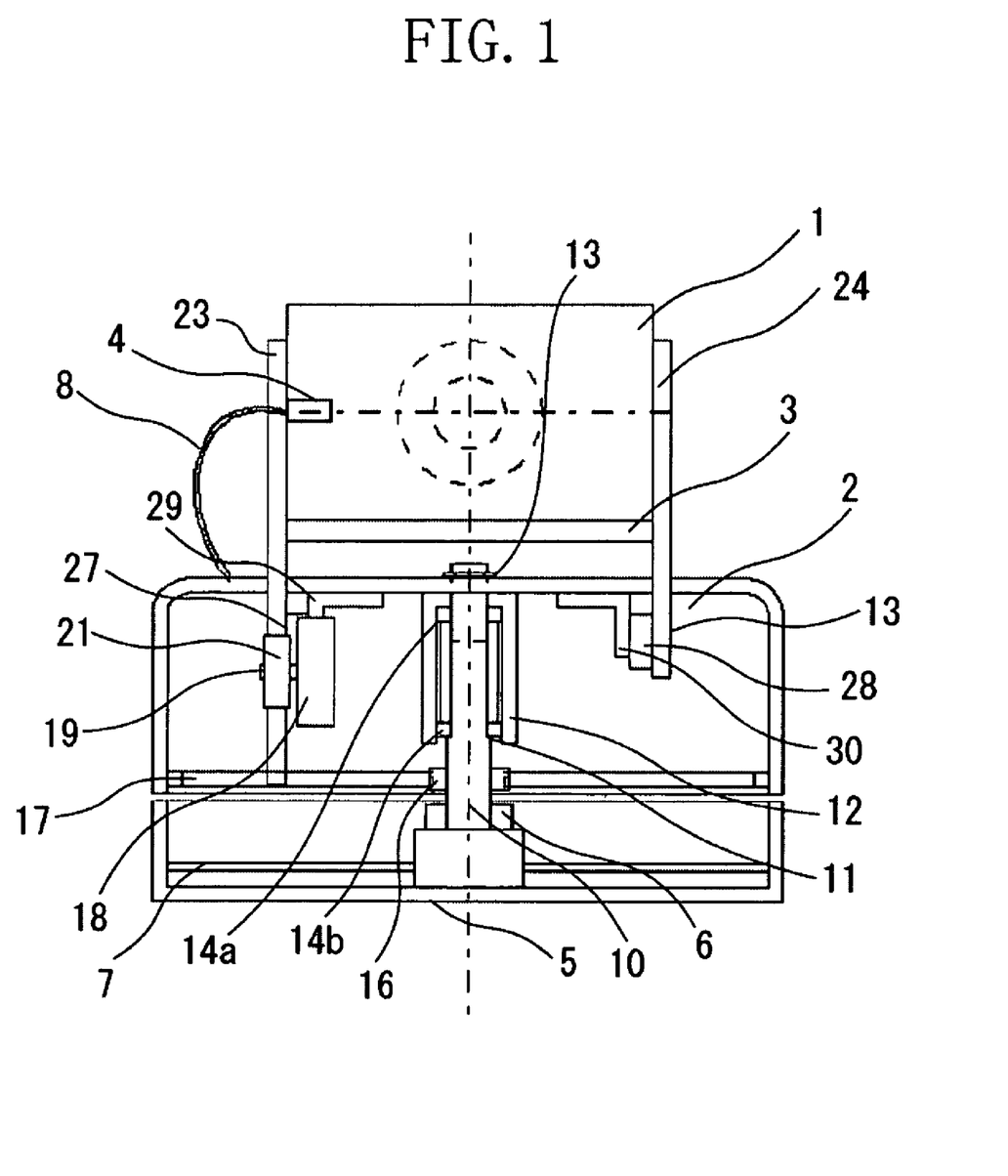
FIG. 1 is a front view illustrating a camera according to a first exemplary embodiment of the present invention.
Figure 2:
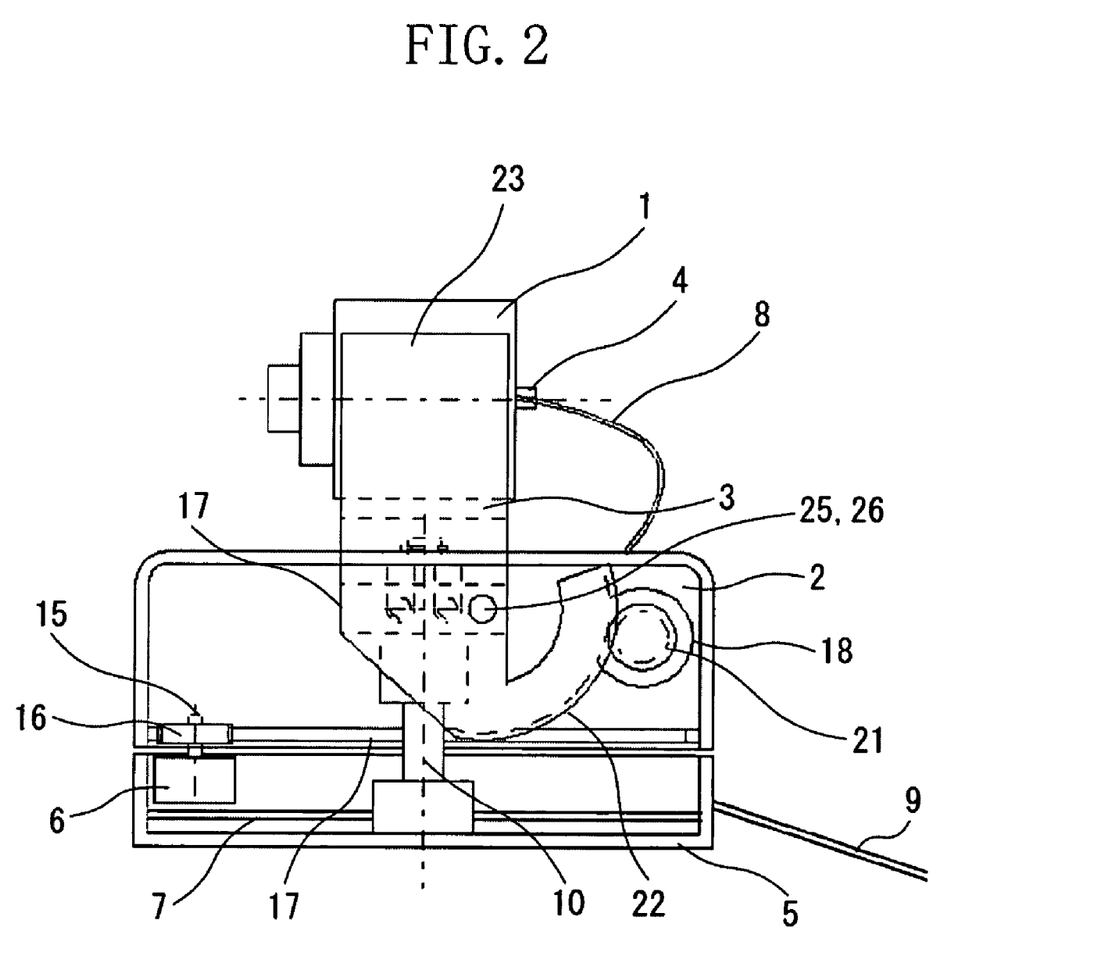
FIG. 2 is a side view illustrating a camera according to the first exemplary embodiment of the present invention.

FIG. 1 is a front view illustrating a camera according to a first exemplary embodiment of the present invention. FIG. 2 is a side view illustrating a camera according to the first exemplary embodiment of the present invention.

In FIGS. 1 and 2, a camera 1 is mounted on a camera rotation means 2. The camera 1 and the camera rotation unit 2 are joined by a joint unit 3. The camera unit 1 has an image blur reducing function for preventing image blur of an image to be captured.

An external terminal 4 inputs a signal for controlling the camera unit 1 from the outside to the camera unit and outputs a video signal. A camera platform fixing unit 5 has a pan motor 6 and a drive circuit 7 to drive the pan motor 6.

A communication cable 8 is for communication between the camera unit 1 and the camera platform fixing unit 5. A control cable 9 supplies electric power to the drive circuit 7 and transmits a video signal obtained by the camera unit 1.

A fixed shaft 10 is press-fitted to the camera platform fixing unit 5. Bearings 14a and 14b are rotatably mounted on the shaft 10. Further, a rotation unit case 12 is coaxially mounted on the shaft via the bearings 14a and 14b. The camera rotation unit 2 is fixed in a vertical direction by a shoulder 11 of the shaft 10 and an E ring 13 so that the camera rotation unit 2 can rotate. The E ring 13 is inserted into the top end portion of the fixing axis 10 penetrating through a hole of the rotation center of the rotation unit case 12 which forms a part of the camera rotation unit 2.

Further, in the pan motor 6, a pan rotating gear 16 is fixed on a rotatable pan motor shaft 15. The pan rotating gear 16 is engaged with a pan gear 17 formed inside the rotation unit case 12.

A tilt motor 18 is fixed on the camera rotation unit 2. Further, a rotation tilt gear 21 is fixed on a tilt motor rotating shaft 19 and is rotated together with the tilt motor rotating shaft 19. A tilt fixing gear 22 is engaged with the rotation tilt gear 21. The tilt fixing gear 22 forms a part of a camera side plate 23.

The camera side plate 23 forms a part of the joint unit 3. A camera presser plate 24 is positioned facing the camera side plate 23. The camera side plate 23 and the camera presser plate 24 configure a part of the joint unit 3 of the camera unit 1.

The joint unit 3 including the camera unit 1 is attached to the camera rotation unit 2 via tilt axes 25 and 26, tilt side plates 27 and 28 fixed inside the camera rotation unit 2, and a stay 29. The tilt axis 25 penetrates through a hollow hole of the tilt fixing gear 22 and makes the camera side plate 23 rotatable.

Figure 3:
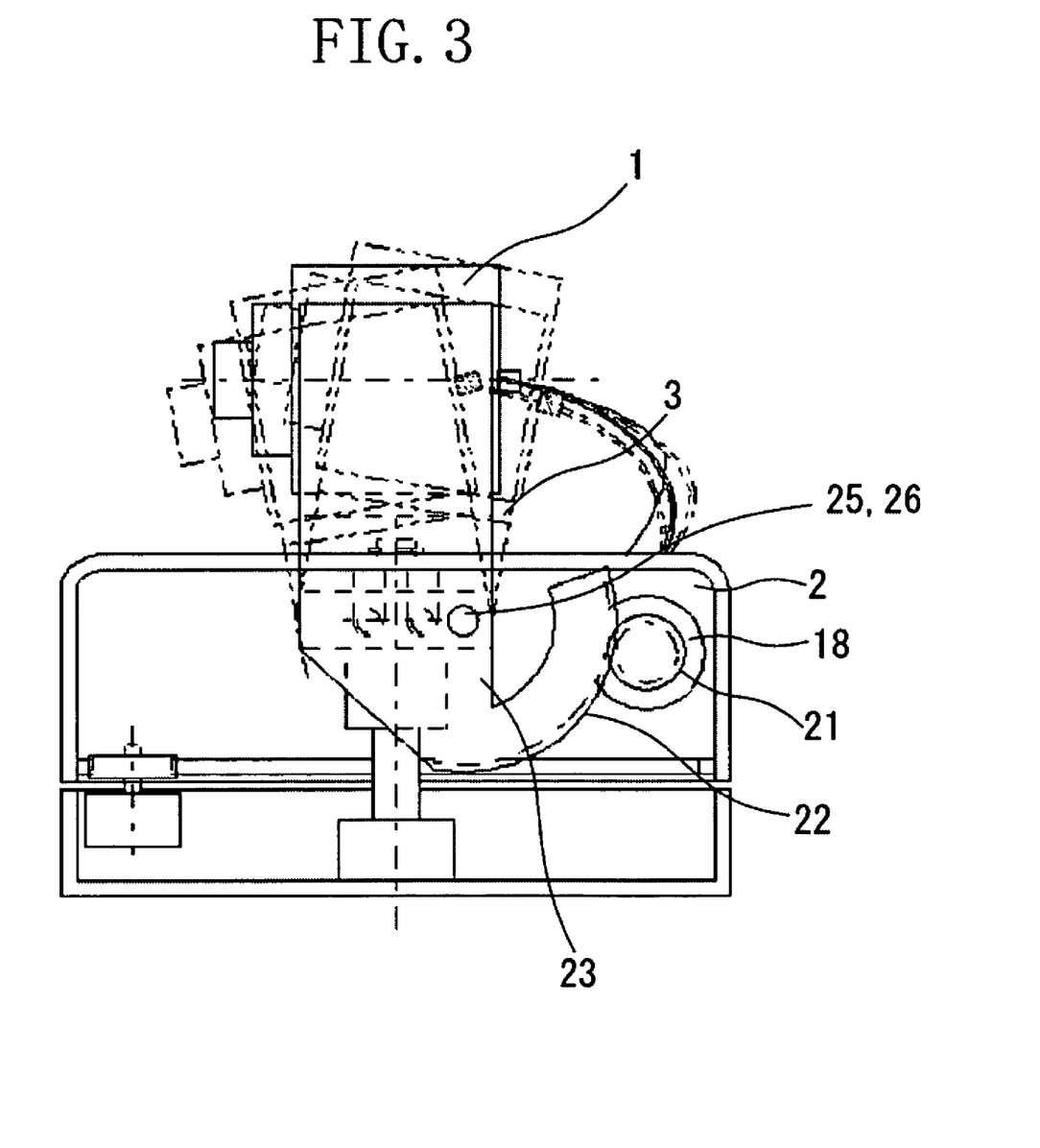
FIG. 3 is a side view illustrating a tilt operation of a camera support for a camera according to the first exemplary embodiment of the present invention.

FIG. 3 is a side view illustrating an example tilt operation according to the first exemplary embodiment of the present invention.

In FIG. 3, the tilt motor 18 rotates and the rotation tilt gear 21 is rotated. Then, the tilt fixing gear 22 engaged with the rotation tilt gear 21 is rotated. In response to the rotation, the camera side plate 23 rotates around the tilt axis 25. As a result of the rotation, the joint unit 3 including the camera unit 1 is subjected to tilt rotation as shown in FIG. 3.

Next, so-called pan rotation will be described in which the camera rotation unit 2 is rotated around the fixed shaft 10 serving as a center axis.

Figure 4:
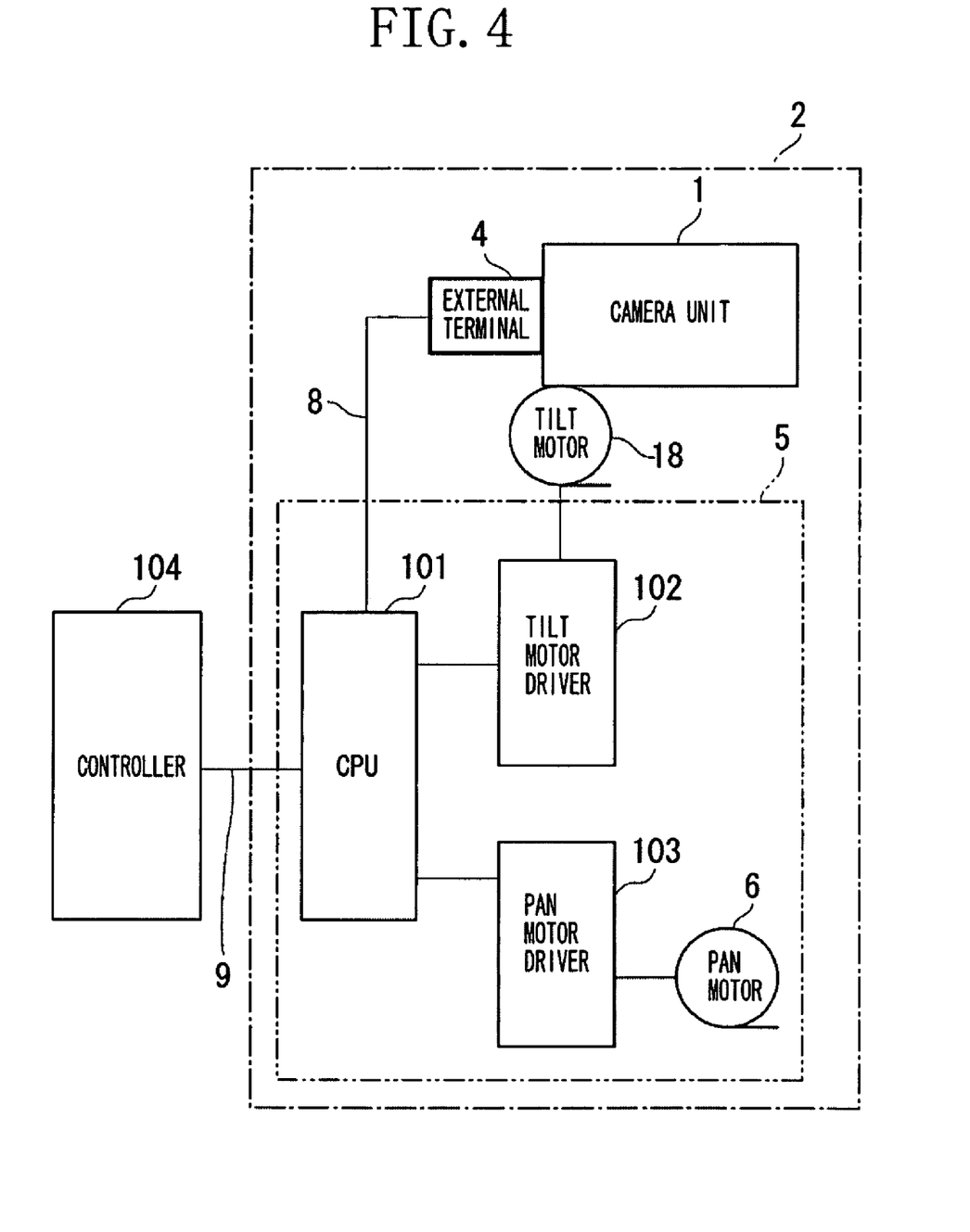
FIG. 4 is a block diagram illustrating a camera according to the first exemplary embodiment of the present invention.

FIG. 4 is a block diagram illustrating a camera according to the first exemplary embodiment of the present invention.

In FIG. 4, an area surrounded by a two-dot dashed line is the camera platform fixing unit 5. Further, an area surrounded by a dot dashed line is the camera rotation unit 2.

In FIG. 4, the camera includes a central processing unit (CPU) 101 which is a processing unit, a tilt motor driver 102 connected to the tilt motor 18, and a pan motor driver 103 connected to the pan motor 6.

The tilt motor driver 102 and the pan motor driver 103 are connected to the CPU 101. Further, the CPU 101 is connected to the camera unit 1 through the external terminal 4 via the communication cable 8.

A controller 104 is connected to the CPU 101 via the controller cable 9. The controller cable 9 can be an Ethernet cable. This configuration can be realized if the controller 104 is an information processing apparatus such as a personal computer, and the CPU 101 has a web server function.

The controller 104 transmits a motor drive start command to the CPU 101 via the controller cable 9. The motor drive start command includes a rotating direction, a rotating speed, and stopping position information.

Based on the motor drive start command, the CPU 101 determines a drive pattern. The CPU 101 transmits a signal to the tilt motor driver 102 and the pan motor driver 103 to execute the determined drive pattern. Then, a drive electric current is supplied to the pan motor 6 and the tilt motor 18 so that the camera rotation unit 2 is moved at a predetermined speed and to a target position.

Next, an image blur reducing function in the camera unit 1 will be described.

Since the camera unit 1 includes image blur reducing means providing the image blur reducing function, if vibration or the like is generated during capturing an image, the camera unit 1 detects an amount of an image blur generated by the vibration to correct the captured image blur by image processing. Alternatively, based on the detected amount of an image blur, the camera unit 1 optically moves a compensating lens relative to an image sensor during capturing an image to correct the image blur. This image blur reducing function can be used in the above-described well-known techniques. Execution and cessation (ON/OFF) of this image blur reducing function can be controlled by not only an ON/OFF switch of the camera unit 1 but also by a signal transmitted from the communication cable 8 connected to the outside.

Further, the image blur reducing function in the camera unit 1 will be described in detail using FIG. 5.

Figure 5:
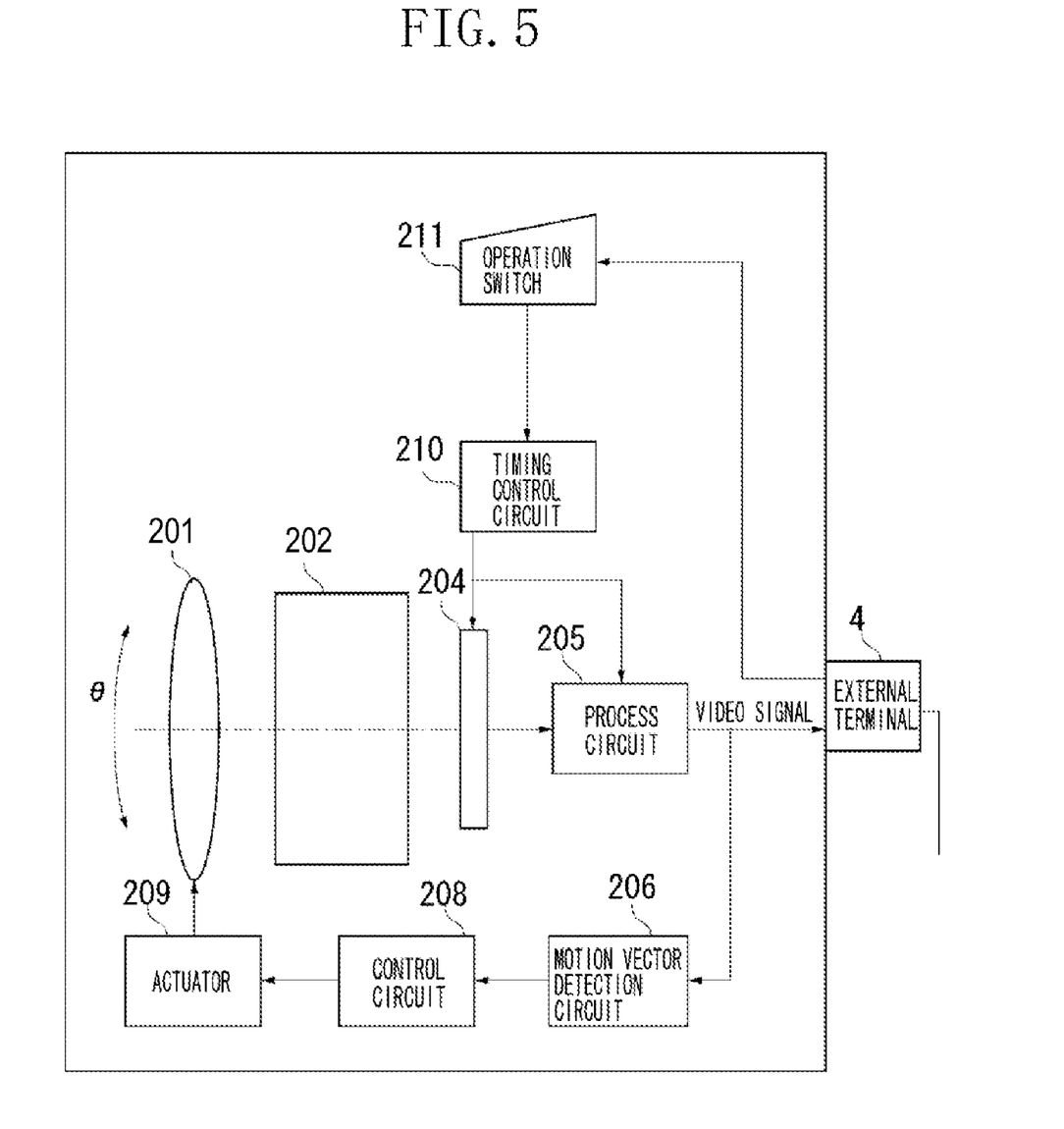
FIG. 5 is a block diagram illustrating an image blur reducing function of a camera in FIG. 1.

FIG. 5 is an example diagram for executing the image blur reducing function of the camera in FIG. 1.

In FIG. 5, a variable angle prism 201 can freely change a photographing optical axis in a pitch direction and a yaw direction. A light beam from a moving object enters a photoelectric conversion face of an image sensor (charge coupled device (CCD)) 204 via the variable angle prism 201 and a zoom lens 202. The image sensor 204 converts an optical image of the object into an electric signal. A process circuit 205 converts the output of the image sensor 204 into a video signal.

A motion vector detection circuit 206 detects an amount of movement and a direction of the object (i.e., a motion vector) by comparing the output signal between a current screen and a previous screen. A control circuit 208 calculates the motion vector detected by the motion vector detection circuit 206 using a predetermined coefficient, generates a drive signal for the variable angle prism 201 to compensate a movement of an image, and supplies it to an actuator 209.

The actuator 209 drives the variable angle prism 201 according to the drive signal from the control circuit 208. Thus, the variable angle prism 201 shifts the photographing optical axis in a pitch direction and a yaw direction so as to compensate an image shake due to the rotation of the camera.

The image sensor 204 can freely change exposure time and an exposure cycle. For example, when a high-speed moving object is shot, the exposure time and the exposure cycle are changed into a high-speed shutter mode such as $\frac{1}{1,000}$ second. Further, to obtain a sufficient signal-to-noise (S/N) ratio under a low illuminance, the exposure time and the exposure cycle are changed into a long-time exposure mode having an exposure cycle of not less than a field cycle.

The exposure time and the exposure cycle of the image sensor 204 are controlled by a control signal from a timing control circuit 210. The exposure time and the exposure cycle can be selected by an operation switch 211. When an operation mode of the image sensor 204 is designated by the operation switch 211, the timing control circuit 210 drives the image sensor 204 in response to the designation.

Further, as shown in FIG. 4, the image blur reducing function can be turned on or off, and a shutter speed can be changed by the controller 104 through the external terminal 4 of the camera unit 1.

When the image blur reducing function is turned on, the CPU 101 of the camera platform fixing unit 5 performs the image blur reducing function during rotation operation of the camera. For example, when the camera moves at a constant rate and in the same direction such as during pan operation, the CPU 101 controls the variable angle prism 201 so that an image after a blur correction follows the direction of rotation. Then, when the CPU 101 determines that the image after the blur correction cannot follow the rotation, the CPU 101 stops the operation of the variable angle prism 201 once and repeats the blur correction operation.

Accordingly, when the image blur reducing function is turned on, while the camera rotation unit 2 is moved at a constant speed, it visually appears such that the camera rotates intermittently (with frequent starts and stops in synchronization). Accordingly, the image itself is hard to see. In this case, normally, the image blur reducing function is intentionally turned off and correction is not executed. Then, after rotation of the camera rotation unit 2 is stopped, the image blur reducing function is turned on.

Next, a sequence when the camera rotation unit 2 stops a high-speed pan rotation will be described.

The moment the camera rotation unit 2 stops the high-speed rotation, the camera rotation unit 2 vibrates in a forward and reverse of the direction of rotation. The vibration is attenuated over time. If the image blur reducing function is turned on immediately after issuing the stop command of the rotation operation for the camera rotation unit 2 and during a vibration period, the above-described vibration in the forward and reverse direction is compensated for.

Next, when the camera rotation unit 2 stops a low-speed rotation, not much vibration in the forward and reverse direction is generated. In this case, the camera rotation unit 2 stops and simultaneously the blur correction function is turned on to make the camera rotation unit 2 robust against disturbance (vibration from the outside) after a stop.

When the camera rotation unit 2 is subjected to intermittent drive operation, since start and stop are repeated, the camera rotation unit 2 will regularly vibrate from side to side. In this case, a blur-corrected image can be obtained if the image blur reducing function is in an on state.

The intermittent drive operation refers to drive operation of repeating high-speed rotation and stop in the range of a small angle when the camera rotation unit 2 cannot execute continuous drive at a constant low speed since torque is insufficient at a low speed due to the influence of the drive motor characteristic. In terms of an average speed, this intermittent drive operation is considered as a low-speed drive.

Figure 6:
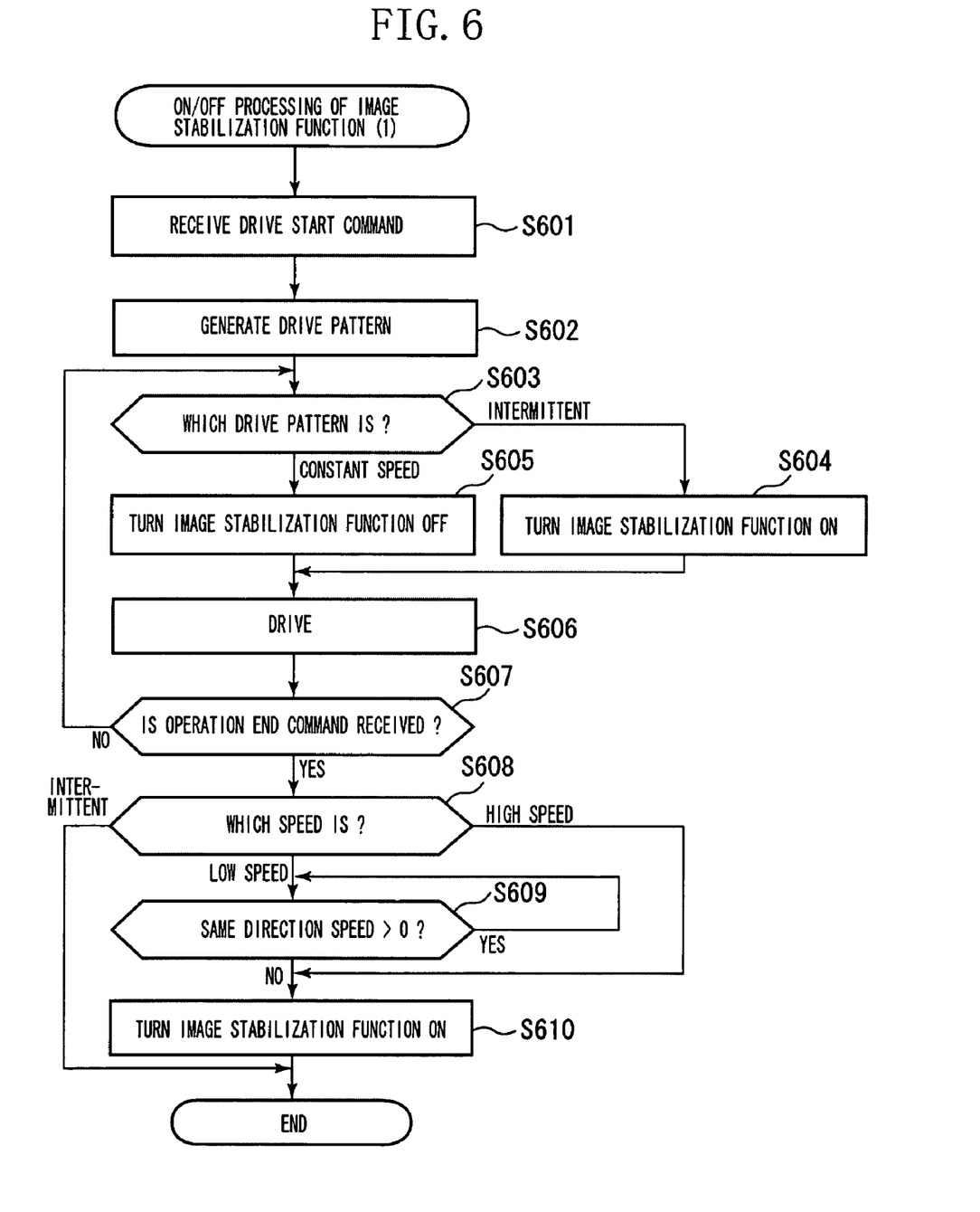
FIG. 6 is an example flowchart illustrating a procedure of the ON/OFF processing of an image blur reducing function of a camera during rotation of a camera rotation unit which is executed by the camera in FIG. 4.

FIG. 6 is a flowchart illustrating ON/OFF processing of an image blur reducing (i.e. vibration-proofing) function of a camera which is executed by the CPU 101 in FIG. 4 during rotation of the camera rotation unit 2.

In FIG. 6, during initial operation, the camera rotation unit 2 stops and the image blur reducing function of the camera unit 1 is turned on. In step S601, the CPU 101 receives a drive start command output from the external controller 104.

Figure 7:
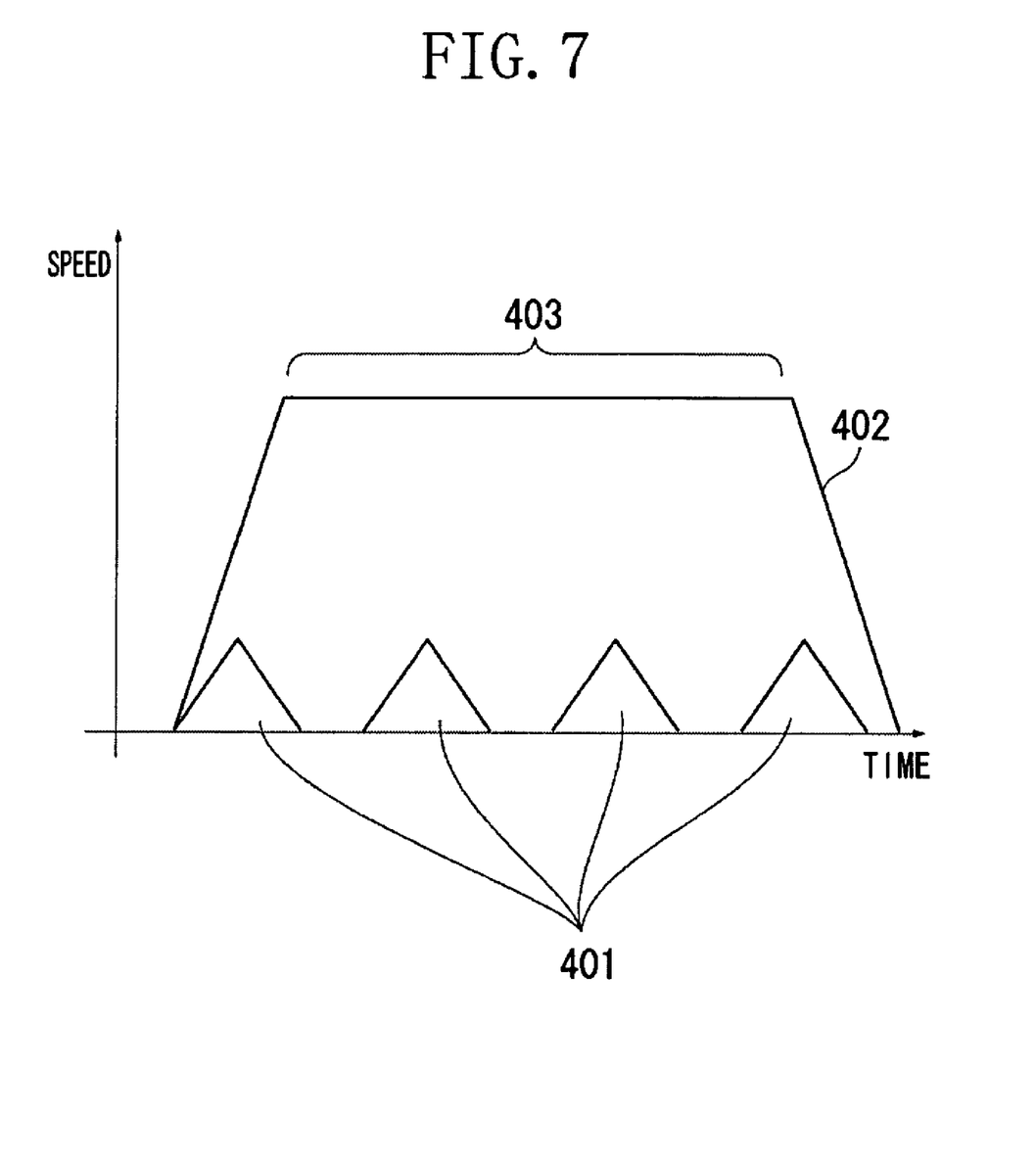
FIG. 7 is a diagram illustrating a drive pattern of a camera rotation unit in FIG. 1.

Then, in step S602, based on the drive start command, the CPU 101 generates either of drive patterns (two types) as shown in FIG. 7. In FIG. 7, a horizontal axis indicates lapse time and a vertical axis indicates a speed of the camera rotation unit 2. An intermittent drive pattern 401 repeats acceleration, deceleration, and stop in that order. A constant speed pattern 402 including an acceleration and a deceleration patterns consists of acceleration, constant speed, deceleration, and stop in that order. The constant speed pattern 402 includes a constant speed region 403. When the drive start command includes a command of low-speed rotation operation, the intermittent drive pattern 401 is generated. When the drive start command includes a command of high-speed rotation operation, the constant speed pattern 402 is generated.

In step S603 of FIG. 6, when the determined drive pattern is the intermittent drive pattern 401, the CPU 101 retains an ON state of the image blur reducing function in step S604. The CPU 101 performs control to start driving the camera rotation unit 2 in step S606.

When the determined drive pattern is the constant speed pattern 402 in step S603, the CPU 101 turns the image blur reducing function off in step S605. Then, in step S606, the CPU 101 performs control to start driving the camera rotation unit 2. Then, the CPU 101 repeats the processing in step S603 to step S606 until the CPU 101 receives an operation end command (YES in step S607).

When the CPU 101 receives the end command of rotation operation or determines that a target angle has been attained (YES in step S607), the process proceeds to step S608. In step S608, the CPU 101 determines whether the drive operation currently operated is the intermittent drive pattern 401, or low-speed rotation operation or high-speed rotation operation of the constant speed pattern 402.

The high-speed rotation operation refers to the operation that generates vibration in a direction opposite to the rotating direction when the rotation operation is stopped. Alternatively, the low-speed rotation operation does not generate vibration when the rotation operation is stopped. When the operation has a higher speed than the speed generating vibration which is stored beforehand in a memory of the CPU 101 in the drive circuit 7 in the camera platform fixing unit 5, the operation is regarded as the high-speed rotation operation. When the operation has a lower speed than that, the operation is regarded as the low-speed rotation operation.

In the intermittent drive pattern (INTERMITTENT in step S608), the CPU 101 ends the processing while retaining the ON state of the image blur reducing function after the rotation operation is stopped.

If the constant speed region 403 in the constant drive pattern is at the low speed (LOW SPEED in step S608), the CPU 101 turns the image blur reducing function on in step S610 when the speed immediately before the stop reaches zero in a process of stopping the rotation operation (NO in step S609) after receiving the operation end command.

In the constant drive pattern and the high-speed drive (HIGH SPEED in step S608), since it is based on the assumption that vibration occurs when the rotation operation is stopped, in step S610, the CPU 101 outputs a stop operation command to the camera rotation unit 2 and simultaneously turns the image blur reducing function on. This is intended to remove an image blur caused by vibration in the forward and reverse direction of rotation.

A reason for turning the image blur reducing function on after the stop of the rotation operation is to suppress disturbance that appears immediately before and after the stop thereof.

Next, the case of shooting a still image in a panning shot mode will be described.

In the panning shot when a still image is shot, that is, in a case where the camera unit 1 continuously keeps pursuing a moving object and shoots an image so that it seems that a background blurs and only the moving object stands still, the image blur reducing function halts the flow of the background and prevents a photographer from shooting an desired image. Thus, when the still image is shot by the panning shot, the image blur reducing function is turned off during the rotation operation of the camera rotation unit 2. The image blur reducing function is turned on simultaneously when the shooting is completed.

Particularly, when a photographer intentionally makes a shutter speed slow to capture an image of a moving object with a blurred background, the opening and closing of a shutter is started and stopped within the constant speed region 403 in FIG. 7. In this manner, the intentions of a photographer can be reflected in a captured image where an object is stopped and a background is blurred.

Figure 8:
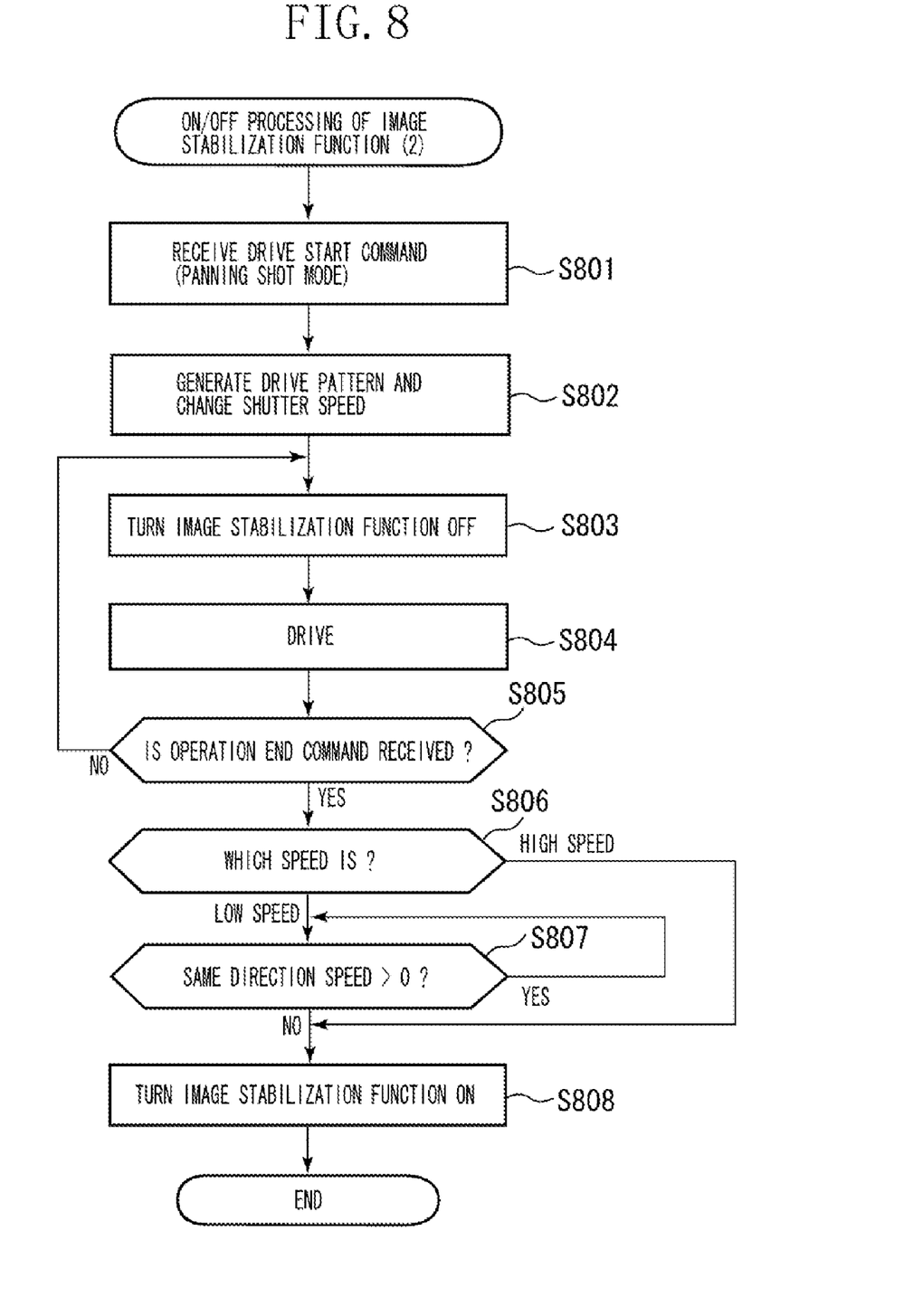
FIG. 8 is a flowchart illustrating a procedure of the ON/OFF processing of an image blur reducing function of a camera during rotation of a camera rotation unit in a panning mode which is executed by a camera in FIG. 4.

FIG. 8 is a flowchart illustrating a procedure of the ON/OFF processing of the image blur reducing function of the camera unit 1 during rotation of the camera rotation unit 2 in a panning shot mode, which is executed by the camera in FIG. 4.

The present processing is executed by the CPU 101 in FIG. 4.

In FIG. 8, it is assumed that the image blur reducing (i.e. vibration proofing) function of the camera unit 1 is in an on state. When the CPU 101 receives a drive start command and a panning shot mode is selected in step S801, the CPU 101 generates a drive pattern in step S802. Then, in step S803, the CPU 101 turns the image blur reducing function off.

In step S804, the CPU 101 controls drive of the camera rotation unit 2. The image blur reducing function is turned off until an operation end command is received (YES in step S805) During this period, shooting of a still image is performed according to a command of the CPU 101. Thereby, the panning shot having a blurred background is realized.

In step S806, the CPU 101 determines a driving speed of the camera rotation unit 2 in the constant speed region 403. When a speed in the constant speed region 403 is determined to be low (LOW SPEED in step S806), in step S807, the CPU 101 determines whether the driving speed has reached zero in a process of stopping the rotation operation upon receiving of the operation end command. When the driving speed of the camera rotation unit 2 reaches zero (NO in step S807), in step S808, the CPU 101 turns on the image blur reducing function.

In a high speed, since it is based on the assumption that vibration occurs, the CPU 101 turns the image blur reducing function on immediately after entering stop operation. This is intended to remove an image blur that is caused by vibration occurring immediately after the stop.

As described above, in any cases, if the CPU 101 can determine which mode (constant speed pattern mode, intermittent drive pattern mode, and panning shot mode) is provided in a drive command, the same sequence can handle the mode without adding particular hardware.

Further, the CPU 101 is provided with an operation posture, a movement of a center of gravity, and vibration and attenuation time by a drive pattern in advance. Then, the CPU 101 collates a drive pattern with the stored drive pattern simultaneously when an operation command is received. The CPU 101 transmits ON/OFF timing of an image blur reducing function during operation and ON/OFF timing of a vibration attenuation image blur reducing function during stop obtained by the stored drive pattern which is the closest to the drive pattern together with the drive command. Thus, a similar function can be realized. Alternatively, the vibration and the attenuation time can be calculated by the CPU 101 to obtain the ON/OFF timing.

Figure 9:
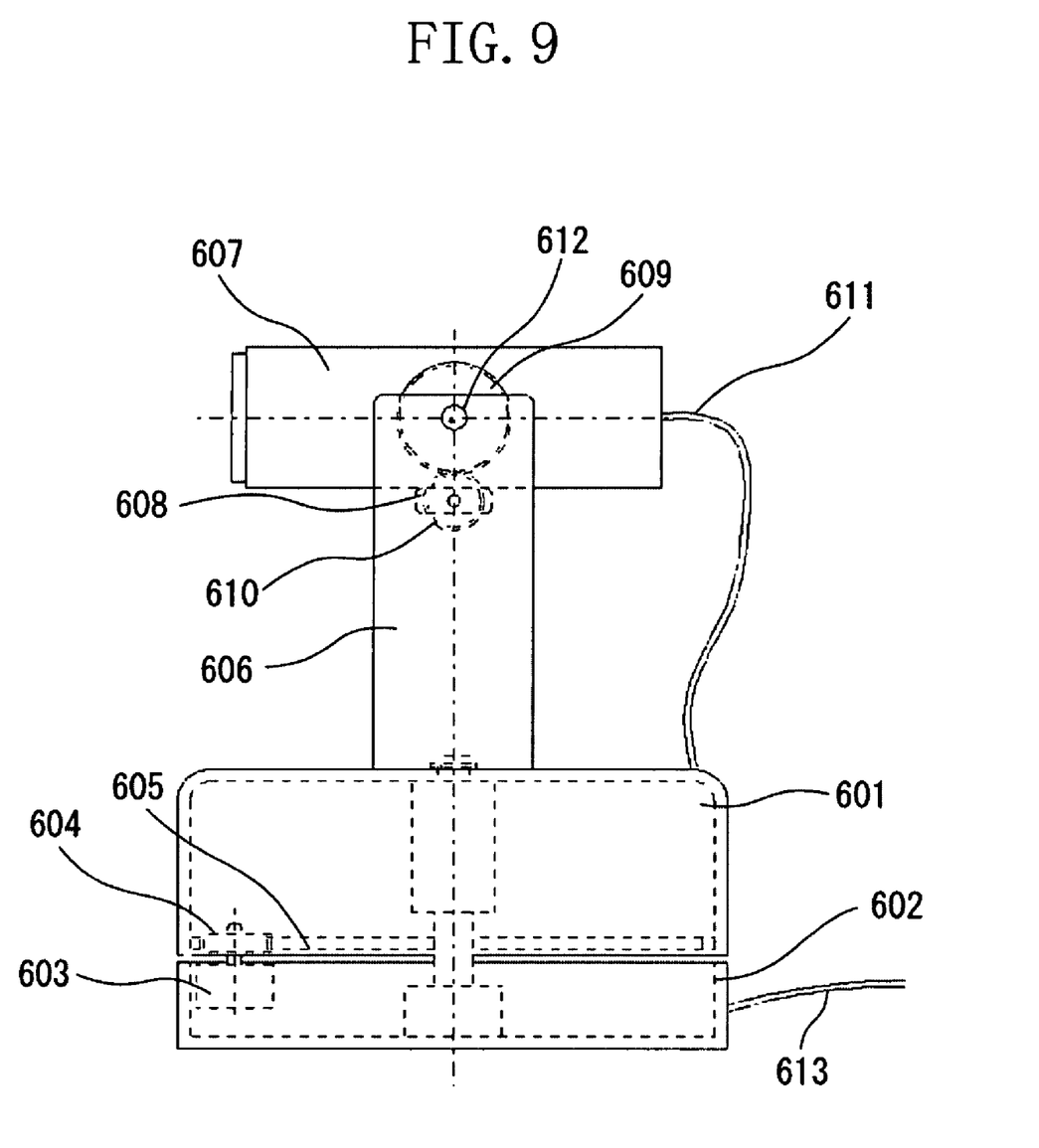
FIG. 9 is a side view illustrating a camera according to a second exemplary embodiment of the present invention.

The pan rotation was described above. During tilt rotation as shown in FIG. 9 which will be described later, the operation can also handle any of the above-described sequence. Furthermore, the same sequence can also be applied to the case in which the pan and the tilt are simultaneously driven.

Second Exemplary Embodiment

FIG. 9 is a side view illustrating an example of a camera according to a second exemplary embodiment of the present invention.

FIG. 9 illustrates an example monitoring camera system. A camera unit 607 includes an image blur reducing function similar to the first exemplary embodiment.

A camera platform includes a rotation unit 601, a fixing unit 602, and a pan motor 603 fixed on the fixing unit 602. A rotation unit of the pan motor 603 includes a pan motor gear 604. A rotation unit gear 605 is included inside the rotation unit 601. The rotation unit gear 605 is intermeshed with the pan motor gear 604. The rotation unit 601 is rotated by rotation of the pan motor 603. The rotation unit 601 includes the camera unit 607 rotatably fixed by a side plate 606.

Further, the camera unit 607 is provided with the image blur reducing function similar to FIG. 5 and also fixed with a tilt motor 608. The side plate 606 includes a tilt fixed axis 612 that supports the camera unit 607 so as to be rotatable.

Further, the camera unit 607 includes a tilt gear 609 coaxial with the tilt fixed axis 612. The tilt gear 609 is intermeshed with a tilt motor gear 610 fixed on a shaft of the tilt motor 608. Rotation of the tilt motor 608 causes the tilt motor gear 610 to rotate. Its rotation force is transferred from the tilt gear 609 to the tilt fixed axis 612. In synchronization with the rotation about the tilt fixed axis 612, the camera unit 607 is rotated on the tilt.

A video signal, a camera control signal, and a tilt motor control signal are transmitted to the camera unit 607 through a camera cable 611. A control cable 613 connects an external controller and the fixing unit 602. The camera transmits and receives the video signal and a monitoring camera control signal via the control cable 613. This allows an ON/OFF control of the above-described image blur reducing function from an external personal computer.

A monitoring camera centrally handles a motion image (continuous shooting). The camera unit 1 centrally handles a still image. Further, both are mechanically different. However, also in the monitoring camera, rendering an operation sequence of the monitoring camera to the sequence shown in FIGS. 6 and 8 allows the monitoring camera to realize an effective image blur reducing function illustrated in the first exemplary embodiment.

As described above, in the exemplary embodiments, the image blur reducing function of an image capture apparatus is selectively turned on and off by conditions such as rotation operation, a rotation speed, a position of a center of gravity and a change in position of a center of gravity which are found in advance before operation. This can prevent an image blur that is generated by disturbance of the camera platform when an image is captured by the image capture apparatus. Further, an image blur on an operation condition in intermittent drive can be prevented. Furthermore, preventing a careless operation shake of the camera rotation unit can eliminate a difference between the intention of a photographer and an image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-110601 filed Apr. 19, 2007, which is hereby incorporated by reference herein in its entirety.

What is claimed is:

1. A camera comprising:
   a camera unit having an image blur reducing function;
   a rotation unit configured to rotate the camera unit; and
   a processor configured to turn the image blur reducing function off during rotation of the camera unit in a constant-speed drive mode in which the rotation unit rotates the camera unit at a constant speed between the start and the end of the rotation operation, and configured to turn the image blur reducing function on during the rotation operation of the camera unit in an intermittent drive mode in which the rotation unit intermittently rotates the camera unit between the start and the end of the rotation operation.

2. The camera according to claim 1, wherein the processor turns the image blur reducing function on when the speed of the rotation operation is reduced to zero in a constant-speed drive mode having a lower constant-speed than a predetermined speed.

3. The camera according to claim 1, wherein the processor turns the image blur reducing function on when it receives a rotation stop command in a constant-speed drive mode having a higher speed than a predetermined speed.

4. A method for controlling an image blur reducing function of a camera including a camera unit having an image blur reducing function and a rotation unit configured to rotate the camera unit, the method comprising:
 turning the image blur reducing function off during rotation operation of the camera unit in a constant-speed drive mode in which the rotation unit is driven at a constant speed between a start and an end of the rotation operation; and
 turning the image blur reducing function on during the rotation operation of the camera unit in an intermittent drive mode in which the rotation unit intermittently executes drive operation from the start to the end of the rotation operation.

5. The method according to claim 4, further comprising:
 turning the image blur reducing function on when the speed of the rotation operation is reduced to zero in the constant-speed drive mode having a lower constant-speed than a predetermined speed.

6. The method according to claim 4, further comprising:
 turning the image blur reducing function on when a rotation stop command is received in the constant-speed drive mode having a higher constant-speed than a predetermined speed.

7. A camera comprising:
 a camera unit having an image blur reducing function;
 rotation means for rotating the camera unit; and
 processing means configured to turn the image blur reducing function off during rotation of the camera unit in a constant-speed drive mode in which the rotation unit rotates the camera unit at a constant speed between the start and the end of the rotation operation, and configured to turn the image blur reducing function on during the rotation operation of the camera unit in an intermittent drive mode in which the rotation unit intermittently rotates the camera unit between the start and the end of the rotation operation.

8. A computer readable storage medium storing a program which executes a method for controlling an image blur reducing function of a camera including a camera unit having an image blur reducing function and a rotation unit configured to rotate the camera unit, the method comprising:
 turning the image blur reducing function off during rotation operation of the camera unit in a constant-speed drive mode in which the rotation unit is driven at a constant speed between a start and an end of the rotation operation; and
 turning the image blur reducing function on during the rotation operation of the camera unit in an intermittent drive mode in which the rotation unit intermittently executes drive operation from the start to the end of the rotation operation.

* * * * *